United States Patent [19]

Yasunaga et al.

[11] Patent Number: 4,923,748
[45] Date of Patent: May 8, 1990

[54] MAGNETIC RECORDING MEDIUM

[75] Inventors: Tadashi Yasunaga; Akio Yanai; Koji Sasazawa, all of Kanagawa, Japan

[73] Assignee: Fuji Photo Film Co., Ltd., Kanagawa, Japan

[21] Appl. No.: 179,924

[22] Filed: Apr. 11, 1988

[30] Foreign Application Priority Data

Apr. 10, 1987 [JP] Japan .................. 62-87193

[51] Int. Cl.⁵ .............................. H01F 10/08
[52] U.S. Cl. .................... 428/336; 427/132; 428/694; 428/900
[58] Field of Search ............ 428/694, 900, 336; 427/132, 131

[56] References Cited

U.S. PATENT DOCUMENTS 4,542,062  9/1985  Takada et al. ............... 428/694
4,567,116  1/1986  Sawada et al. .............. 428/694

FOREIGN PATENT DOCUMENTS 59-207426  11/1984  Japan .
61-054023  3/1986  Japan .

Primary Examiner—Paul J. Thibodeau
Attorney, Agent, or Firm—Sughrue, Mion, Zinn, MacPeak & Seas

[57] ABSTRACT

A durable, weather-resistant and anti-corrosive magnetic recording medium is disclosed, which comprises a non-magnetic support having coated thereon a thin film type magnetic layer comprising iron, nitrogen oxygen and at least one element selected from the group consisting of titanium, silicon, aluminum and tantalum.

7 Claims, 1 Drawing Sheet

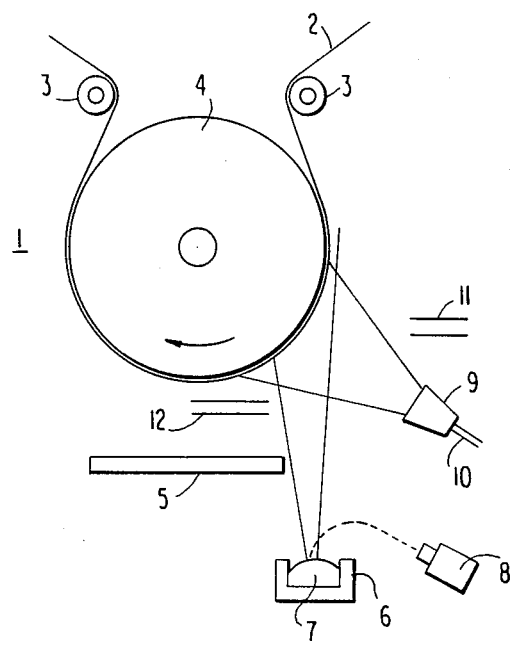

MAGNETIC RECORDING MEDIUM

FIELD OF THE INVENTION

The present invention relates to a magnetic recording medium, and more particularly it relates to a magnetic recording medium of an iron nitride thin film type having good electromagnetic characteristics.

BACKGROUND OF THE INVENTION

A coated type magnetic recording medium prepared by coating a magnetic coating composition comprised of ferromagnetic particles dispersed in an organic binder has widely been used as a magnetic recording medium. However, these coated type magnetic recording mediums have some defects such as low saturation magnetization due to the use of metal oxide particles as ferromagnetic particles, and the densities of ferromagnetic particles in a magnetic layer cannot be increased because the magnetic layer contains an organic binder which renders the coated type magnetic recording medium unsuitable for high density recording and manufacturing steps are complicated.

With the increased demand for higher density recording in recent years, a magnetic recording medium of a thin metal film type provided on a non-magnetic support has been developed. The thin metal film type magnetic recording medium is prepared by forming a thin metal film on a non-magnetic support by a vapour deposition method such as vacuum deposition, sputtering or ion plating or a metal plating method such as electroplating or electroless plating. Although the thin films of the magnetic compositions are not limited to metals, metals are the typical example of the magnetic compositions. Therefore, the magnetic recording medium having a thin film is hereinafter referred to as a magnetic recording medium of a thin metal film type. Further this type medium is called a magnetic recording medium of a non-binder type because the medium does not contain an organic binder.

Such a recording medium of a thin metal film type has drawn much attention recently; since the thin film is composed of ferromagnetic metals without an organic binder, a higher saturation magnetization and coercive force can be obtained as well as a reduction in film thickness as compared to the coated type magnetic recording mediums. Also, the thin metal film type medium exhibits a low effect of demagnetization at a short wavelength region and manufacturing steps can be simplified.

The thin metal film type recording medium appears to have a uniform and smooth metal surface, but upon microscopic analysis it is seen that it has such a rough structure because of the alignment of the fine metal particles. Therefore, the thin metal film type magnetic recording medium easily corrodes and has poorer weather resistance and poorer anti-corrosive properties compared to the coated type magnetic recording medium.

A magnetic recording medium is generally rubbed by a magnetic head on the surface thereof upon recording and reproduction, and when even slight corrosion is present on a metal thin film, it comes off upon friction, causing head-clogging, thereby damaging the magnetic head and the magnetic recording medium itself.

The magnetic recording medium of a thin metal film type poor durability because, as it has poor durability because, as it has a smooth surface of a thin metal film, friction is high, thereby readily causing stick-slip. The durability on a VTR of the thin metal film type medium is inferior to the coated type medium.

Known methods of attempting to improve both the weather resistance an durability of the thin metal film type magnetic recording medium include a method of nitrogenating the surface of a film layer by ion plating (Japanese Patent Application (OPI) No. 33806/75), a method of providing a silicon nitride film by sputtering (Japanese Patent Application (OPI) No. 30304/78), a method of providing a nonmagnetic surface layer by exposing a magnetic film to discharge in an atmosphere of nitrogen gas and the like (Japanese Patent Application (OPI) No. 85403/78) and a method of providing a nitrogenated thin metal film on a magnetic thin metal film (Japanese Patent Application (OPI) No. 143111/79). The term "OPI" as used herein refers to a "published unexamined Japanese patent application".

Additionally, a magnetic thin film composed of iron nitride, or of iron and iron nitride as disclosed in European Patent No. 8328 and Japanese Patent Application (OPI) No. 87809/84 has been proposed as a magnetic recording medium of a non-binder type having excellent weather resistance. Another magnetic recording medium is disclosed in Japanese Patent Application (OPI) No. 54023/86, which has a magnetic thin film mainly composed of iron oxide nitride on a non-magnetic support. The magnetic thin film has the composition having the following formula.

$$Fe_{1-x-y}N_xO_y \ (0.25 \leq x+y < 0.6)$$

The magnetic recording medium having a thin magnetic layer composed of iron oxide nitride is hereinafter referred to as a magnetic recording medium of an iron oxide nitride thin film type.

As described above, various protective layers are provided, but further improvements as to weather resistance and durability are still necessary. That is, in order to obtain sufficient effects of a protective layer, the film thickness must be increased, resulting in decrease of outputs due to spacing loss. In the above described magnetic recording medium mainly composed of iron nitride or of iron oxide nitride, weather resistance is greatly improved, but electromagnetic characteristics are deteriorated.

SUMMARY OF THE INVENTION

An object of the present invention is to overcome the disadvantages of the prior art recording mediums and to provide a useful magnetic recording medium having good-anti-corrosive properties, excellent durability and high magnetic characteristics.

Both excellent anti-corrosive property and electromagnetic properties could be obtained by incorporating into a magnetic layer of an iron oxide nitride thin film at least one element selected from titanium, silicon, aluminum and tantalum.

The present invention relates to a magnetic recording medium comprising a non-magnetic support having provided thereon a magnetic layer of an iron oxide nitride thin film, comprising iron, nitrogen, oxygen and at least one element selected from titanium, silicon, aluminum and tantalum.

BRIEF EXPLANATION OF THE DRAWING

The FIGURE is an exemplary apparatus for preparing a magnetic recording medium of the present invention by a vapour deposition method.

DETAILED DESCRIPTION OF THE INVENTION

The magnetic layer of an iron oxide nitride thin film comprises iron oxide nitride or a mixture containing iron nitride and iron oxide, and the magnetic layer preferably contains from about 2 to about 30 atomic % of nitrogen and oxygen, respectively, and more preferably from about 4 to about 20 atomic % of nitrogen and from about 5 to about 20 atomic % of oxygen.

As described above, the magnetic layer of the present invention is characterized in the fourth element, i.e., titanium, silicon, aluminum and/or tantalum. It is preferred that the fourth element(s) is present in an amount of from about 0.1 to about 30 atomic %, more preferably from about 0.5 to about 15 atomic % based on the amount of iron in the thin film.

Titanium, silicon, aluminum and tantalum are more easily nitrogenated than iron; therefore, those elements are completely nitrogenated upon preparation of the iron oxide nitride thin film. The resulting nitride tends to segregate in crystalline intergranule, i.e., the surface region of crystalline pillar particles, of the iron oxide nitride. Owing to that tendency, the crystals of iron oxide nitride are more finely granulated, thereby decreasing the noise of the iron oxide nitride thin film.

The magnetic layer of the iron oxide nitride thin film is prepared on a non-magnetic support by a so-called inclined vapour deposition method. The vapour deposition is performed by heating a mixture of iron and at least one of titanium, silicon, aluminum and tantalum in a crucible by electron beams to vaporize iron atoms and to jet the steam thereof to the non-magnetic support at an inclined angle. In this instance, an ion gun is installed in the vacuum chamber and nitrogen ions are supplied therefrom. Oxygen may be supplied together with nitrogen or it may be introduced in atmospheric gas form at the vapour deposition area. The nitrogen atoms at this stage are more chemically reactive than those at the normal state (the nitrogen introduced into the vacuum chamber is in the normal state), and therefore are easily reacted with the above described metals to form a nitride. Alternatively, at least one of titanium, silicon, aluminum and tantalum can be contained in another crucible. In this case, the element may be vaporized by heating with electron beams and jetted onto the non-magnetic support together with the vaporized iron.

In this case, the amounts of iron, at least one of titanium, silicon, aluminum and tantalum, nitrogen and oxygen can be adjusted to be within a predetermined range by controlling not only the strength of electron beams, but also the amounts of nitrogen ions and oxygen gas to be supplied.

The FIGURE is an apparatus 1 for forming an iron oxide nitride thin film by vapour deposition. The non-magnetic support 2 is sent to a cooling can 4 through a guiding roller 3. While the support is conveyed, an iron oxide nitride thin film is vapour-deposited on the surface of the support. Iron 7, a material to be vaporized, containing at least one of titanium, silicon, aluminum and tantalum is put into a crucible 6. Atoms of at least one element selected from iron, titanium, silicon, aluminum and tantalum are vaporized by irradiating electron beams ejected from an electron gun 8 and are shot to the non-magnetic support 2. The vaporized material is vapour-deposited on the support 2 at an inclined angle by the presence of a mask 5. Nitrogen 10 is supplied via an ion gun 9. Ionized nitrogen is supplied to the vapour-deposited area simultaneously with oxygen, which is supplied through an oxygen introducing pipe 11 or 12. The chamber pressure at vapour deposition is about from $10^{-3}$ to $10^{-6}$ Torr.

The magnetic layer of the iron oxide nitride thin film in the present invention has a thickness of from about 0.02 to about 5.0 $\mu$m, preferably from about 0.05 to about 2.0 $\mu$m.

Suitable non-magnetic supports used in the present invention include plastics such as polyethylene terephthalate, polyimide, polyamide, polyvinyl chloride, cellulose triacetate and polycarbonate.

A lubricating layer may be provided on the magnetic layer in the magnetic recording medium of the present invention. The lubricating agents used in the present invention include at least one selected from the group consisting of fatty acids having from 12 to 18 carbon atoms, metal salts of the said fatty acids, silicone oils, and fatty acid esters composed of a monobasic acid having from 2 to 20 carbon atoms and a monohydric alcohol having from 3 to 12 carbon atoms. The additive amount thereof is from 0.5 to 20 mg/m$^2$ on the magnetic layer.

A backing layer may be provided on the surface of the non-magnetic support opposite the magnetic layer, if desired.

A layer composed of organic substances or inorganic substances may be provided between the magnetic layer of the iron oxide nitride thin film and the non-magnetic support.

The present invention will be illustrated in more detail by the following Examples, but should not be limited thereto. Unless otherwise indicated herein, all parts, percents, ratios and the like are by weight.

EXAMPLE 1

Using the vapour-deposition apparatus as shown in the FIGURE, a magnetic layer of an iron oxide nitride thin film containing iron, titanium, nitrogen and oxygen was formed on a polyethylene terephthalate film having a thickness of 13 $\mu$m by an inclined vapour-deposition method, and a magnetic tape was prepared therefrom. Iron and titanium were put into a crucible 6 and were heated with electron gun 8 whereby vaporized iron and titanium were discharged. Nitrogen ions, obtained by irradiating nitrogen gas with an ion gun, and oxygen, via pipes 11 and 12 were applied to the support. The angle of incidence of the iron and titanium atom jet was controlled by a mask 5 and was adjusted to the range of from 60° to 90°. The chamber pressure at vapour deposition was $2.6 \times 10^{-4}$ Torr. The vapour-deposited film had a thickness of 0.15 $\mu$m.

As a result of analyzing the thus formed thin iron oxide nitride film by Auger Electron Spectroscopy (AES), it was found that the content of titanium was 3 atomic % based on the amount of iron and the contents of nitrogen and oxygen were 7 atomic % and 10 atomic %, respectively, based on the total elements of the thin film. C/N of the thus obtained sample of the magnetic tape was measured using a modified 8 m/m VTR (FUJIX-8M6, a trade name, manufactured by Fuji Photo Film Co., Ltd.). Carrier and noise were measured at 6 MHz and 5 MHz, respectively. The results are shown in Table 1.

EXAMPLE 2

A magnetic tape was prepared in the same manner as in Example 1 except that iron and silicon were put into a crucible 6. The content of silicon in the thus formed iron oxide nitride thin film was measured in the same manner as above and found to be 1.5 atomic % based on the amount of iron. The contents of nitrogen and oxygen in the thin film were the same as those in Example 1. C/N of the thus obtained sample of the magnetic tape was measured in the same manner as above. The results are shown in Table 1.

EXAMPLE 3

A magnetic tape was prepared in the same manner as in Example 1 except that iron and aluminum were put into a crucible 6. The content of aluminum in the thus formed iron oxide nitride thin film was measured in the same manner as above and found to be 5 atomic % based on the amount of iron. The contents of nitrogen and oxygen in the thin film were the same as those in Example 1. C/N of the thus obtained sample of the magnetic tape was measured in the same manner as in Example 1. The results are shown in Table 1.

EXAMPLE 4

A magnetic tape was prepared in the same manner as in Example 1 except that iron and tantalum were put into a crucible 6. The content of tantalum in the thus formed iron oxide nitride thin film was measured in the same manner as above and found to be 5 atomic % based on iron. The contents of nitrogen and oxygen in the thin film were the same as those in Example 1. C/N of the thus obtained sample of the magnetic tape was measured in the same manner as in Example 1. The results are shown in Table 1.

COMPARATIVE EXAMPLE 1

A magnetic tape was prepared in the same manner as in Example 1 except that only iron was put into a crucible 6. C/N of the thus obtained sample was measured in the same manner as in Example 1, and was adjusted to be 0 dB as a standard tape for comparison in Table 1.

COMPARATIVE EXAMPLE 2

A magnetic tape was prepared in the same manner as in Example 1 except that in this case, an ion gun was not operated, and only 80 vol % $N_2$ and 20 vol % $O_2$ were introduced through pipes 11 and 12. The gas amount was adjusted so that the chamber pressure at vapour-deposition was the same as in Example 1, $2.6 \times 10^{-4}$ Torr. The angle of incidence was within the range of from 60° to 90° and the vapour-deposited film thickness was 0.15 μm.

In accordance with AES analysis, the titanium content was the same as that in Example 1, 3 atomic %, but the content of nitrogen was too low to detect. C/N of the sample magnetic tape obtained was measured. The results obtained are shown in Table 1.

TABLE 1

| Example No. | Elements in the composition of thin film | C/N |
| --- | --- | --- |
| Example 1 | Fe + N + o + 3 atomic % Ti* | +2 dB |
| Example 2 | Fe + N + O + 1.5 atomic % Si* | +3 dB |
| Example 3 | Fe + N + O + 5 atomic % Al* | +2 dB |
| Example 4 | Fe + N + O + 5 atomic % Ta* | +2 dB |
| Comparative Example 1 | Fe + N + O | 0 dB |
| Comparative Example 2 | Fe + (N) + O + 3 atomic % Ti* | −3 dB |

*the content of the fourth element based on the content of iron

As clear from the results shown in Table 1, the magnetic recording medium of the present invention exhibits high C/N and is accordingly suitable for higher density recording.

The sample of Comparative Example 2, prepared without operating an ion gun, exhibited poor C/N than that of the present invention. The reason is believed to be that since the sample of Comparative Example 2 was prepared without undergoing ion irradiation, the magnetic particles (Fe in this case) become comparatively large particles, resulting in increasing noise. On the other hand, the samples of Examples 1 to 4 were prepared undergoing ion irradiation, and therefore magnetic Fe particles are much more finely granulated in the form of iron nitride or iron oxide nitride, and magnetic domain is small, resulting in decreasing noise.

The magnetic recording medium of the present invention has good electromagnetic properties, it has high C/N and therefore is suitable for high density recording. The reason is believed to be that the nitride of at least one of titanium, silicon, aluminum and tantalum is segregated in the intergranule of iron oxide nitride crystals causing the iron oxide nitride crystals to be finely granulated. The magnetic layer of the present invention contains nitrogen and oxygen, and therefore exhibits excellent anti-corrosive properties.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer of iron oxide nitride thin film comprising iron, nitrogen, oxygen and at least one element selected from the group consisting of silicon and aluminum.

2. A magnetic recording medium according to claim 1, wherein said at least one element selected from the group consisting of silicon and aluminum is present in an amount of from about 0.1 to about 30 atomic % based on the amount of iron in said thin film.

3. A magnetic recording medium according to claim 2, wherein said at least one element is present in an amount of from about 0.5 to about 15 atomic % based on the amount of iron in said thin film.

4. A magnetic recording medium according to claim 1, wherein said thin film has a thickness of from about 0.02 μm to about 5.0 μm.

5. A magnetic recording medium according to claim 4, wherein the thickness of said thin film is from bout 0.05 μm to about 2.0 μm.

6. A magnetic recording medium according to claim 1, wherein the non-magnetic support is a plastic material selected from the group consisting of polyethylene terephthalate, polyimide, polyamide, polyvinyl chloride, cellulose triacetate and polycarbonate.

7. A magnetic recording medium according to claim 1, wherein said thin film is provided onto the non-magnetic support layer by vapour-deposition with supplying nitrogen ions using an ion gun.

* * * * *